(12) United States Patent
Nakashima et al.

(10) Patent No.: US 9,353,843 B2
(45) Date of Patent: May 31, 2016

(54) AUTOMATIC TRANSMISSION

(75) Inventors: Kyosei Nakashima, Hiroshima (JP);
Toshihisa Marusue, Hiroshima (JP);
Kensuke Ueda, Aki-gun (JP); Masanori Sasaki, Higashi-Hiroshima (JP);
Masamichi Fujikawa, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/345,220

(22) PCT Filed: Sep. 5, 2012

(86) PCT No.: PCT/JP2012/005635
§ 371 (c)(1),
(2), (4) Date: Mar. 14, 2014

(87) PCT Pub. No.: WO2013/046550
PCT Pub. Date: Apr. 4, 2013

(65) Prior Publication Data
US 2014/0345998 A1    Nov. 27, 2014

(30) Foreign Application Priority Data

Sep. 26, 2011   (JP) .................................. 2011-209490

(51) Int. Cl.
| F16H 45/00 | (2006.01) |
| F16D 25/10 | (2006.01) |
| F16D 48/02 | (2006.01) |
| F16D 21/06 | (2006.01) |
| F16D 25/12 | (2006.01) |
| F16D 25/0638 | (2006.01) |

(52) U.S. Cl.
CPC ............. *F16H 45/00* (2013.01); *F16D 21/06* (2013.01); *F16D 48/02* (2013.01); *F16D 25/0638* (2013.01); *F16D 25/123* (2013.01); *F16D 2021/0661* (2013.01); *F16D 2048/0224* (2013.01); *F16D 2500/1045* (2013.01); *F16D 2500/1085* (2013.01); *F16D 2500/5104* (2013.01); *Y02T 10/76* (2013.01)

(58) Field of Classification Search
None
See application file for complete search history.

(56) References Cited

U.S. PATENT DOCUMENTS

| 5,630,492 | A | 5/1997 | Yoshikawa et al. |
| 2003/0168306 | A1* | 9/2003 | Gorman et al. ............ 192/106 F |

(Continued)

FOREIGN PATENT DOCUMENTS

| CN | 101315120 A | 12/2008 |
| CN | 101403435 A | 4/2009 |

(Continued)

OTHER PUBLICATIONS

International Search Report; PCT/JP2012/005635; Oct. 2, 2012.

*Primary Examiner* — Colby M Hansen
(74) *Attorney, Agent, or Firm* — Studebaker & Brackett PC

(57) ABSTRACT

Automatic transmission 1 includes second friction plates 17 connecting a second drum 27 to a second hub 37, a second engagement hydraulic chamber 67, a second centrifugal balance chamber 77, and a second piston 47 engaging and disengaging the second friction plates 17. The second centrifugal balance chamber 77 overlaps the second friction plates 17 in the axial direction in the automatic transmission 1. The automatic transmission 1 further includes a second oil passage 9 for discharging hydraulic oil in the second centrifugal balance chamber 77 to a position not overlapping the second friction plates 17 in the axial direction.

16 Claims, 3 Drawing Sheets

(56) References Cited

U.S. PATENT DOCUMENTS

| | | |
|---|---|---|
| 2004/0077449 A1 | 4/2004 | Biermann et al. |
| 2008/0108468 A1 | 5/2008 | Iwasaki et al. |
| 2008/0300095 A1 | 12/2008 | Doi et al. |
| 2009/0088282 A1 | 4/2009 | Iwasaki et al. |
| 2009/0114500 A1* | 5/2009 | Kato et al. ............... 192/87.15 |
| 2009/0223769 A1 | 9/2009 | Nohl et al. |
| 2010/0011896 A1 | 1/2010 | Iwasaki et al. |
| 2010/0072015 A1* | 3/2010 | Toyota ............... F16D 25/0638 192/3.33 |

FOREIGN PATENT DOCUMENTS

| | | |
|---|---|---|
| DE | 69500951 T2 | 3/1998 |
| DE | 10248172 A1 | 4/2004 |
| JP | H10-131984 A | 5/1998 |
| JP | 11-022748 A | 1/1999 |
| JP | 2001-041261 A | 2/2001 |
| JP | 2007-032636 A | 2/2007 |
| JP | 2008-116015 A | 5/2008 |
| JP | 2010-025213 A | 2/2010 |

* cited by examiner

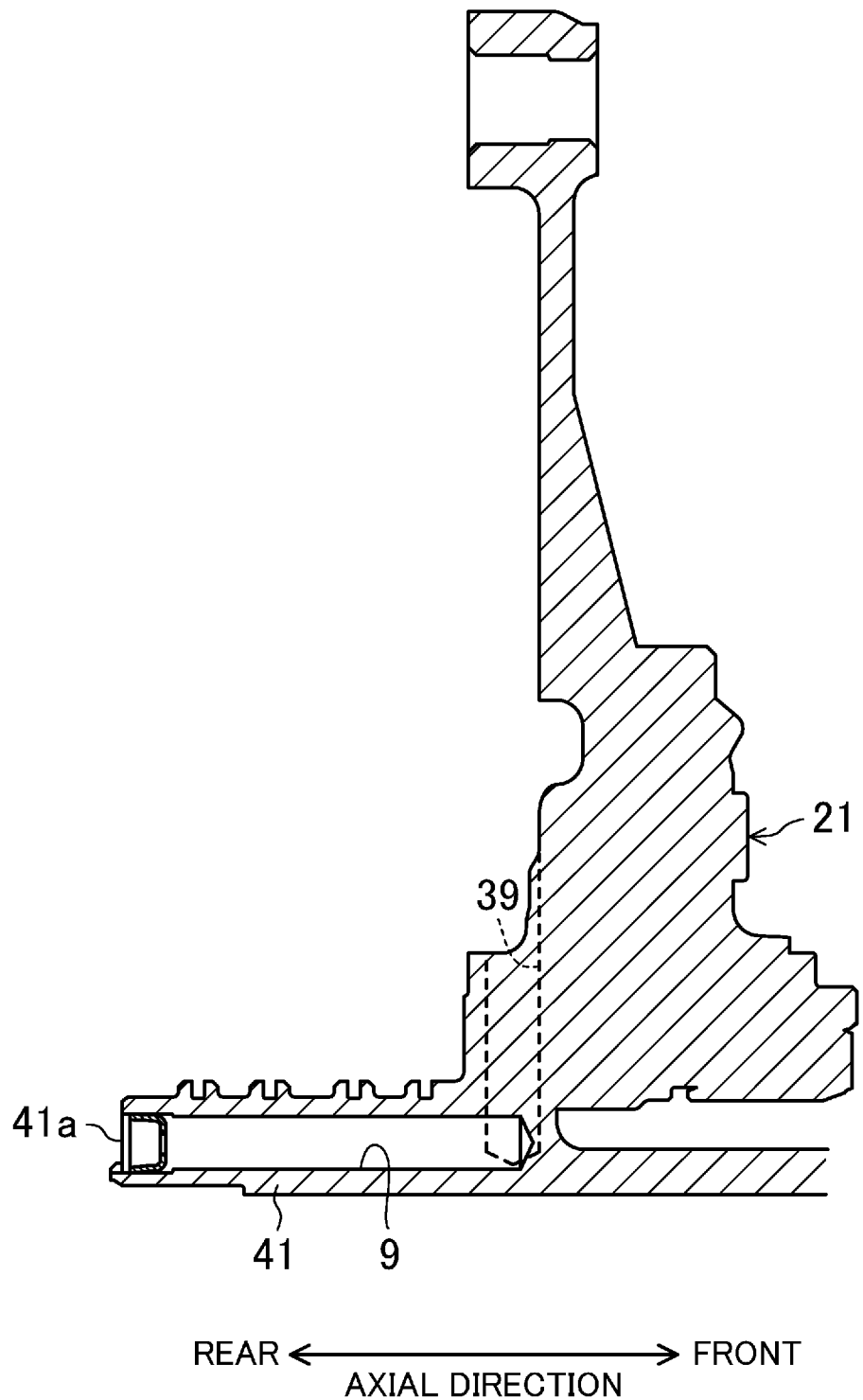

AUTOMATIC TRANSMISSION

TECHNICAL FIELD

The present invention relates to automatic transmission including centrifugal balance chambers overlapping friction plates in the axial direction.

BACKGROUND ART

Conventionally known automatic transmission reduces malfunctions such as excessive rises in the pressure of engagement hydraulic chambers of pistons, which engage or disengage clutches (i.e., frictional engagement elements), over set values. For this purpose, each centrifugal balance chamber for cancelling the centrifugal hydraulic pressure is provided on the opposite side of the engagement hydraulic chamber with a piston interposed therebetween. The centrifugal balance chamber stores hydraulic oil. As a result, not only in the engagement hydraulic chamber but also in the centrifugal balance chamber, the same level of centrifugal hydraulic pressure is generated so that the centrifugal hydraulic pressure generated in the engagement hydraulic chamber and the centrifugal hydraulic pressure generated in in the centrifugal balance chamber cancel one another.

In this automatic transmission, there is a need to discharge excessive hydraulic oil from the centrifugal balance chamber. For example, Patent Document 1 shows a drum clutch of automatic transmission, in which a long hole (i.e., through-hole) for discharging hydraulic oil outside is formed in a centrifugal cancel plate (i.e., seal plate) for providing a centrifugal chancel chamber (i.e., centrifugal balance chamber) between a clutch piston and the centrifugal chancel chamber.

CITATION LIST

Patent Document

PATENT DOCUMENT 1: Japanese Unexamined Patent Publication No. 2007-32636

SUMMARY OF THE INVENTION

Technical Problem

However, in Patent Document 1, the long hole, more precisely, the centrifugal cancel plate having the long hole, overlaps friction plates in the axial direction of an input shaft. Thus, a large amount of hydraulic oil discharged from the centrifugal chancel chamber through the long hole falls on the friction plates to serve as rotational resistance of the friction plates to degrade the fuel efficiency.

In order to solve the problem, it is considered to arrange the friction plates and the centrifugal chancel chamber not to overlap in the axial direction so that the hydraulic oil discharged from the centrifugal chancel chamber does not fall on the friction plates. This arrangement increases the axial length direction of the automatic transmission itself. It is thus difficult to meet the demand for downsizing the automatic transmission.

The present invention was made in view of this problem. It is an objective of the present invention to provide a technique of reducing degradation in fuel efficiency in automatic transmission, which includes a centrifugal balance chamber overlapping friction plates in the axial direction, while downsizing the automatic transmission in the axial direction.

Solution to the Problem

In order to achieve the objective, in automatic transmission according to the present invention, while the positional relation between a centrifugal balance chamber and friction plates is unchanged, hydraulic oil in the centrifugal balance chamber is discharged to a position not to fall on the friction plates.

Specifically, a first aspect of the invention provides automatic transmission including a frictional engagement element for transmitting power input from a drive source via an input shaft. The frictional engagement element includes friction plates for connecting a drum to a hub, an engagement hydraulic chamber and a centrifugal balance chamber located more inward than the friction plates in a radial direction, a piston segmenting the engagement hydraulic chamber from the centrifugal balance chamber in an axial direction, and engaging and disengaging the friction plates based on a pressure difference between hydraulic oil in the chambers, and the centrifugal balance chamber overlapping the friction plates in the axial direction.

The automatic transmission further includes a discharge section for discharging the hydraulic oil in the centrifugal balance chamber to a position not overlapping the friction plates in the axial direction.

In the first aspect of the invention, while the positional relation between the centrifugal balance chamber and the friction plates is unchanged, the hydraulic oil in the centrifugal balance chamber is discharged by the discharge section to the position not overlapping the friction plates in the axial direction (of the input shaft), in the other words, to a position not to fall on the friction plates. As a result, degradation in the fuel efficiency is reduced, while downsizing the automatic transmission in the axial direction by arranging the centrifugal balance chamber to overlap the friction plates in the axial direction.

According to a second aspect of the invention, in the first aspect of the invention, the discharge section is located more inward than the centrifugal balance chamber in the radial direction.

In the second aspect of the invention, the discharge section is located more inward than the centrifugal balance chamber in the radial direction, which is located more inward than the friction plates in the radial direction. As a result, the hydraulic oil in the centrifugal balance chamber is discharged to the position not overlapping the friction plates in the axial direction without influencing the arrangement of the engagement hydraulic chamber, the friction plates, the piston, etc., which are aligned with the centrifugal balance chamber in the axial direction.

According to a third aspect of the invention, the automatic transmission of the second aspect of the invention further includes a cylindrical member supporting the input shaft inserted thereinto. The discharge section includes an oil passage formed in the cylindrical member and extending in the axial direction. An end of the oil passage at a non-drive source side in the axial direction communicates with the centrifugal balance chamber. An end of the oil passage at a drive source side in the axial direction communicates with a discharge oil passage provided in a position not overlapping the friction plates in the axial direction to extend in the radial direction.

The third aspect of the invention suitably provides the discharge section, which is formed more inward than the centrifugal balance chamber in the radial direction, using no additional member, etc., but the existing members forming the automatic transmission.

According to a fourth aspect of the invention, in the third aspect of the invention, the frictional engagement element includes a plurality of frictional engagement elements. The discharge oil passage is, in the axial direction, closer to the drive source side than a drum of the one of the frictional engagement elements, which is the closest to a front cover blocking an end of a transmission case at the drive source side in the axial direction.

In the fourth aspect of the invention, the hydraulic oil in the centrifugal balance chamber is discharged outside the drum of the one of the frictional engagement elements, which is the closest to the front cover blocking the end of the transmission case at the drive source side in the axial direction, via the discharge oil passage. This reduces rotational resistance not only between the friction plates, but also between the members located more inward than the drum and causing differential rotation.

According to a fifth aspect of the invention, the automatic transmission of the third aspect of the invention further includes a seal plate facing the piston in the axial direction such that the centrifugal balance chamber is located between the seal plate and the piston; and a sleeve externally fitted to the cylindrical member, connected to the input shaft, and supporting an inner circumference of the seal plate at an outer circumference thereof. A substantially annular space is formed at an end of the cylindrical member at the non-drive source side in the axial direction to be surrounded by the end of the cylindrical member, the input shaft, and the sleeve, and to communicate with the oil passage. A through-hole is formed in the sleeve to connect the space to the centrifugal balance chamber, and to extend in the radial direction. The sleeve is welded to the input shaft to reduce leakage of the hydraulic oil toward the friction plates, which flows from the centrifugal balance chamber to the oil passage via the space.

In the fifth aspect of the invention, the leakage of the hydraulic oil toward the friction plates, which flows from the centrifugal balance chamber to the oil passage through the through-hole formed in the sleeve, and the space surrounded by the end of the cylindrical member, the input shaft, and the sleeve. This reliably reduces degradation in the fuel efficiency.

According to a sixth aspect of the invention, any one of the first-fifth aspects of the invention, the input shaft is transversely mounted in a vehicle along a width of the vehicle.

In the sixth aspect of the invention, degradation in the fuel efficiency is reduced in front engine-front drive vehicles including automatic transmission, which particularly needs to be downsized in the axial direction.

Advantages of the Invention

In the automatic transmission according to the present invention, the positional relation between the centrifugal balance chamber and the friction plates, i.e., overlap between the centrifugal balance chamber and the friction plates in the axial direction is unchanged, which contributes to downsizing of the automatic transmission in the axial direction. However, the hydraulic oil in the centrifugal balance chamber is discharged by the discharge section in the position not overlapping the friction plates in the axial direction. As a result, degradation in the fuel efficiency is reduced, while downsizing the automatic transmission in the axial direction.

BRIEF DESCRIPTION OF THE DRAWINGS

FIG. 3 is a longitudinal sectional view of the front cover.

DESCRIPTION OF EMBODIMENTS

An embodiment of the present invention will be described hereinafter in detail with reference to the drawings.

Figure 1:
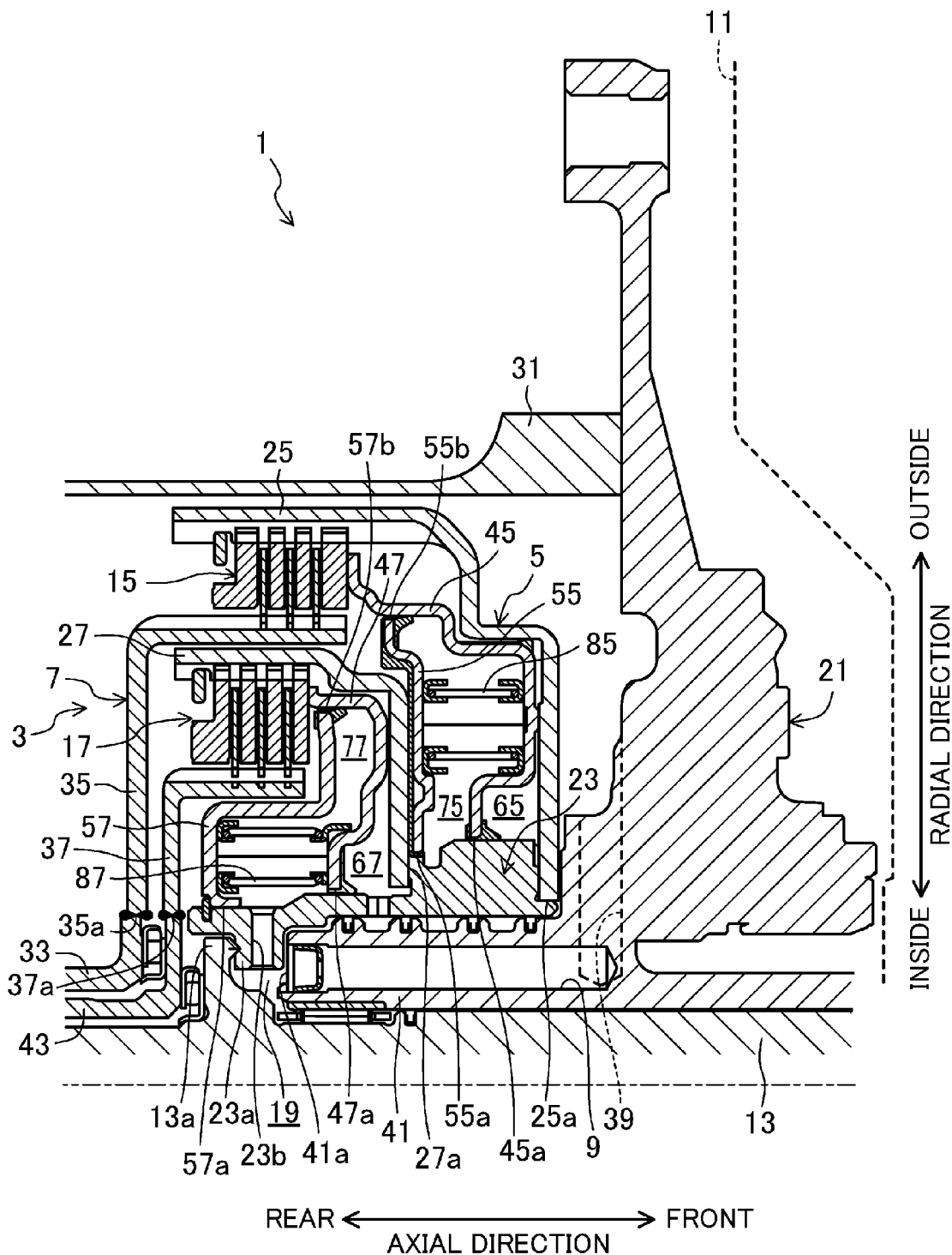
FIG. 1 is a longitudinal sectional view illustrating a portion of a clutch pack of automatic transmission according to an embodiment of the present invention, which is located higher than the axis line of an input shaft.

FIG. 1 illustrates a portion of a clutch pack of automatic transmission according to this embodiment, which is located higher than the axis line of an input shaft. This automatic transmission 1 is mounted in a transverse engine vehicle such as a front engine-front drive vehicle, etc. The automatic transmission 1 includes first and second clutches 5 and 7, which receive power from a torque converter (i.e., a drive source) 11 attached to an engine output shaft (not shown) via an input shaft 13, a transmission mechanism (not shown), which receives the power from both or one of these clutches 5 and 7, and a transmission case 31 housing these first and second clutches 5 and 7 and the transmission mechanism. In this embodiment, the set of elements forming the first clutch 5, the second clutch 7, and a sleeve 23 is referred to as a clutch pack 3. In the following description, the torque converter side (i.e., the drive source side) in the axial direction is referred to as the front, and the non-torque converter side (i.e., the non-drive source side) in the axial direction is referred to as the rear.

As shown in FIG. 1, the first clutch (i.e., the frictional engagement element) 5 is a multi-plate clutch including a first drum 25 and a first hub 35. In order to transmit the power, which is input from the torque converter 11 via the input shaft 13, to the transmission mechanism, the first clutch 5 further includes a plurality of first friction plates 15 for connecting the first drum 25 to the first hub 35, a first piston 45 for engaging and disengaging the first friction plates 15, a first engagement hydraulic chamber 65 and a first centrifugal balance chamber 75, which are supplied with hydraulic oil for pressing the first piston 45, and a first seal plate 55 facing the first piston 45 in the axial direction such that the first centrifugal balance chamber 75 is located between the first seal plate 55 and the first piston 45.

Similarly, the second clutch (i.e., the frictional engagement element) 7 is also a multi-plate clutch including a second drum 27 and a second hub 37. In order to transmit the power, which is input from the torque converter 11 via the input shaft 13, to the transmission mechanism, the second clutch 7 further includes a plurality of second friction plates 17 for connecting the second drum 27 to the second hub 37, a second piston 47 for engaging and disengaging the second friction plates 17, a second engagement hydraulic chamber 67 and a second centrifugal balance chamber 77, which are supplied with hydraulic oil for pressing the second piston 47, a second seal plate 57 facing the second piston 47 in the axial direction such that the second centrifugal balance chamber 77 is located between the second seal plate 57 and the second piston 47.

The plurality of first friction plates 15 are arranged outside the second friction plates 17 in the radial direction in parallel with the plurality of second friction plates 17, in the other words, to overlap the plurality of second friction plates 17 in the axial direction of the input shaft 13 (i.e., to overlap the plurality of second friction plates 17 as viewed from the radial direction of the input shaft 13).

The first drum 25 supports the plurality of first friction plates 15 at the outer circumference of the first friction plates 15 movably in the axial direction. The first drum 25 covers the radial outside and the front of the second clutch 7. Its inner circumferential end 25a is fixed to the sleeve 23, which will be described later. On the other hand, the first hub 35 supports the plurality of first friction plates 15 at the inner circumference of the first friction plates 15 movably in the axial direction. The first hub 35 covers the rear of the second clutch 7. Its circumferential end 35a is connected to an output member 33 of the clutch.

The first engagement hydraulic chamber 65 and the first centrifugal balance chamber 75 are adjacent to one another at the front of the second clutch 7 between the first seal plate 55, which has an inner circumferential end 55a supported by the sleeve 23, and the first drum 25. The first engagement hydraulic chamber 65 and the first centrifugal balance chamber 75 are segmented from one another in the axial direction by the first piston 45 engaging and disengaging the plurality of second friction plates 17 based on the pressure difference between hydraulic oil in these chambers. In the other words, in the first clutch 5, the space segmented by the first drum 25 and the first piston 45 forms the first engagement hydraulic chamber 65, and the space segmented by the first piston 45 and the first seal plate 55 forms the first centrifugal balance chamber 75.

A lip seal for making the first engagement hydraulic chamber 65 and the first centrifugal balance chamber 75 oil-tight is attached to each of an inner circumferential end 45a of the first piston 45, which is in contact with the sleeve 23, and an outer circumferential end 55b of the first seal plate 55, which is in contact with the inner circumferential surface of the first piston 45. Reference numeral 85 in the first centrifugal balance chamber 75 indicates a return spring, which is attached between the first piston 45 and the first seal plate 55 to bias the first piston 45 toward the disengaging direction (the front).

As such, the first clutch 5 covers the front, the rear, and the radial outside of the second clutch 7. Thus, the first drum 25 corresponds to a drum of the one of frictional engagement elements, which is the closest to a front cover 21 blocking the front end of the transmission case 31 in the present invention.

On the other hand, the second drum 27 supports the plurality of second friction plates 17 at the outer circumference of the second friction plates 17 movably in the axial direction. The second drum 27 is located between the first hub 35 and the second friction plates 17 in the radial direction. Its inner circumferential end 27a is fixed to the sleeve 23. On the other hand, the second hub 37 supports the plurality of second friction plates 17 at the inner circumference of the second friction plates 17 movably in the axial direction. The second hub 37 is located at the front of the first hub 35. Its inner circumferential end 37a is connected to an output member 43 of the clutch.

The second engagement hydraulic chamber 67 and the second centrifugal balance chamber 77 are located more inward than the second friction plates 17 in the radial direction, between the second seal plate 57, which has an inner circumferential end 57a supported by the sleeve 23, and the second drum 27. The second engagement hydraulic chamber 67 and the second centrifugal balance chamber 77 are segmented from one another in the axial direction by the second piston 47 engaging and disengaging the plurality of second friction plates 17 based on the pressure difference between hydraulic oil in these chambers. In the other words, in the second clutch 7, the space segmented by the second drum 27 and the second piston 47 forms the second engagement hydraulic chamber 67, and the space segmented by the second piston 47 and the second seal plate 57 forms the second centrifugal balance chamber 77. The second centrifugal balance chamber 77 overlaps the second friction plates 17 in the axial direction (i.e., overlaps the plurality of second friction plates 17 as viewed from the radial direction of the input shaft 13).

A lip seal for making the second engagement hydraulic chamber 67 and the second centrifugal balance chamber 77 oil-tight is attached to each of an inner circumferential end 47a of the second piston 47, which is in contact with the sleeve 23, and an outer circumferential end 57b of the second seal plate 57, which is in contact with the inner circumferential surface of the second piston 47. Reference numeral 87 in the second centrifugal balance chamber 77 indicates a return spring, which is attached between the second piston 47 and the second seal plate 57 to bias the second piston 47 toward the disengaging direction (the front).

The above-described arrangement is employed in the clutch pack 3, that is, the plurality of second friction plates 17 are located more inward than the plurality of first friction plates 15 in the radial direction, and the second centrifugal balance chamber 77 is located more inward than the plurality of second friction plates 17 in the radial direction. This downsizes the automatic transmission 1 of this embodiment in the axial direction (i.e., along the width of the vehicle).

The sleeve 23 is fixed to the inner circumferential ends 25a and 27a of the first and second drums 25 and 27, and supports the first and second seal plates 55 and 57 at the inner circumferential ends 55a and 57a. The sleeve 23 is externally fitted to a boss (a cylindrical member) 41 slidably and rotatably. The boss 41 is integrally formed with the front cover 21, extends from the center of the rear surface of the front cover 21 toward the rear, and supports the input shaft 13 inserted thereinto. The sleeve 23 has an annular step 23a, which protrudes inside in the radial direction, at the portion extending toward the rear beyond the top of (the rear end surface 41a) of the boss 41. This step 23a is welded to a flange 13a of the input shaft 13. As such, the first and second drums 25 and 27 are connected to the input shaft 13 via the sleeve 23. As a result, when the input shaft 13 rotated by the power from the torque converter 11, the first and second drums 25 and 27 rotate accordingly.

As such, the sleeve 23 is externally fitted to the boss 41 and connected to the input shaft 13, thereby forming at the rear end of the boss 41, a substantially annular space 19 surrounded by the end surface 41a of the boss 41, the input shaft 13, and the sleeve 23. In the other words, the sleeve 23 is externally fitted to the boss 41, and the step 23a of the sleeve 23 is connected to the flange 13a of the input shaft 13, thereby forming at the rear of the boss 41, the substantially annular space 19 segmented by the inner circumferential surface of the step 23a of the sleeve 23, the front surface of the flange 13a of the input shaft 13, the outer circumferential surface of the input shaft 13, and the rear end surface 41a of the boss 41.

Figure 2:
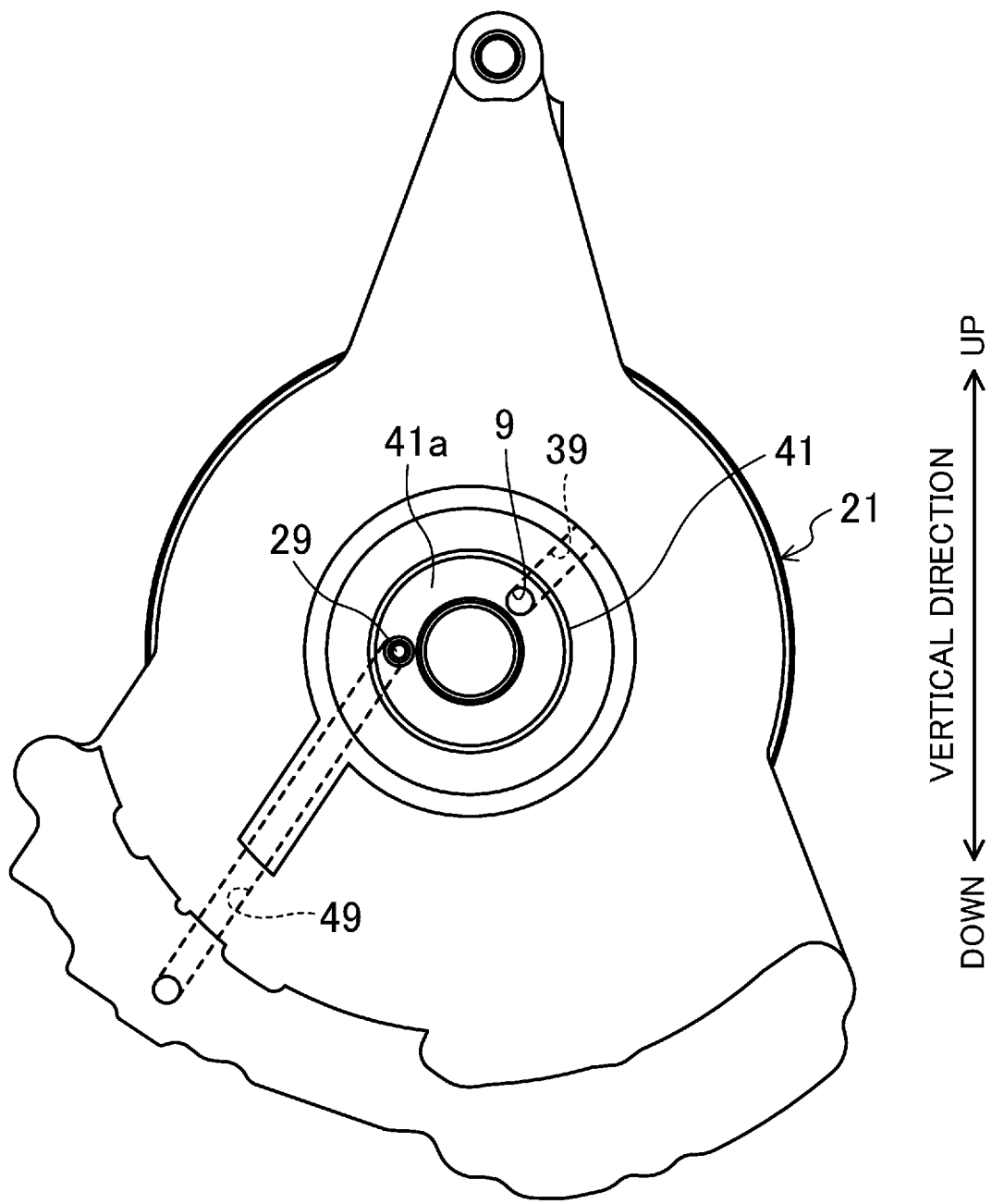
FIG. 2 is a back view of a front cover viewed from a non-torque converter side.

As shown in FIG. 2, the boss 41 includes a first oil passage 29 extending in the axial direction and supplying the hydraulic oil to the second centrifugal balance chamber 77. In addition to the first oil passage 29, the boss 41 also includes oil passages for supplying the hydraulic oil to the first engagement hydraulic chamber 65, the first centrifugal balance chamber 75, and the second engagement hydraulic chamber 67. The oil passages are, however, not shown and described in this embodiment.

The front end of the first oil passage 29 communicates with an oil supply passage 49 formed in the front cover 21 to extend obliquely downward from the center of the front cover 21, and supplying the hydraulic oil from an oil pump (not shown) driven by an engine via the torque converter 11. On the other hand, the rear end of the first oil passage 29 communicates with the second centrifugal balance chamber 77 via an oil passage (not shown) formed in the sleeve 23. As a result, the hydraulic oil from the oil pump flows through the oil supply passage 49 and then through the first oil passage 29, and supplied to the second centrifugal balance chamber 77.

As such, the hydraulic oil is supplied to the second centrifugal balance chamber 77 via the first oil passage 29, thereby pressing the second piston 47 toward the front to disengage the second clutch 7. The hydraulic oil is continuously supplied from the oil pump during the operation of the engine. Thus, in pressing the second piston 47 toward the rear, or maintaining the position of the second piston 47, etc., there is a need to discharge excessive hydraulic oil from the second centrifugal balance chamber 77. However, different from the first clutch 5, in the second clutch 7, the second friction plates 17 overlap the second centrifugal balance chamber 77 in the axial direction as described above. For example, if a long hole is formed in the second seal plate 57, and the hydraulic oil is discharged outside from the long hole, a large amount of discharged hydraulic oil falls on the second friction plates 17 to serve as rotational resistance of the second friction plates 17 to degrade the fuel efficiency.

To address the problem, the automatic transmission 1 according to this embodiment further includes a discharge section located more inward than the second centrifugal balance chamber 77 in the radial direction to discharge the hydraulic oil in the second centrifugal balance chamber 77 to the position not overlapping the second friction plates 17 in the axial direction (i.e., not overlapping the plurality of second friction plates 17 as viewed from the radial direction of the input shaft 13). Specifically, as shown in FIGS. 1-3, the discharge section includes a second oil passage 9 formed in the boss 41 and extending in the axial direction. The rear end of the second oil passage 9 communicates with the second centrifugal balance chamber 77. The front end of the second oil passage 9 communicates with an oil discharge passage 39 provided in a position not overlapping the second friction plates 17 in the axial direction to extend toward the radial direction.

More specifically, the rear end of the second oil passage 9 communicates with the space 19. At the portion of the sleeve 23 with the step 23a, a through-hole 23b is formed, which connects the space 19 to the second centrifugal balance chamber 77, and extends in the radial direction. As a result, the rear end of the second oil passage 9 communicates with the second centrifugal balance chamber 77 via the space 19 and the through-hole 23b. On the other hand, the front end of the second oil passage 9 communicates with the oil discharge passage 39 formed in the front cover 21 to extend obliquely upward from the center of the front cover 21.

The discharge section is configured as above, thereby allowing the excessive hydraulic oil in the second centrifugal balance chamber 77 to pass through the through-hole 23b formed in the sleeve 23, and then flow into the second oil passage 9 via the space 19. In conventional automatic transmission, a spline formed at the inner circumferential surface of the sleeve 23 at the top is often engaged to a spline formed at the corresponding outer circumferential surface of the input shaft 13 to connect the sleeve 23 to the input shaft 13. In the automatic transmission 1 according to this embodiment, as described above, the step 23a of the sleeve 23 is welded to the flange 13a of the input shaft 13, thereby sealing the gap therebetween. This reduces leakage of the hydraulic oil toward the second friction plates 17, which flows to the second oil passage 9 from the second centrifugal balance chamber 77 via the space 19.

After reaching the front cover 21, the hydraulic oil, which flows through the second oil passage 9 from the rear to the front, flows through the oil discharge passage 39 formed in the front cover 21 to be discharged outside the first drum 25. As such, the hydraulic oil is discharged to the position not overlapping the second friction plates 17 in the axial direction, more specifically, from the oil discharge passage 39 located in a position closer to the front than the first drum 25. This reduces rotational resistance not only between the second friction plates 17, but between the members located more inward than the first drum 25 and causing differential rotation, for example, between the first hub 35 and the first seal plate 55, etc.

The hydraulic oil is pushed out obliquely upward through the oil discharge passage 39. The hydraulic oil always fills the oil supply passage 49, the first oil passage 29, the second centrifugal balance chamber 77, the through-hole 23b, the space 19, the second oil passage 9, and the oil discharge passage 39. Thus, the hydraulic oil can be pushed out obliquely upward only by the supply force of the oil pump without using an extra pump for sucking out the hydraulic oil.

Advantages

According to this embodiment, the positional relation between the second centrifugal balance chamber 77 and the second friction plates 17 is unchanged. The hydraulic oil in the second centrifugal balance chamber 77 is discharged by the discharge section to the position not overlapping the second friction plates 17 in the axial direction (of the input shaft 13), in the other words, to a position not to fall on the second friction plates 17. As a result, degradation in the fuel efficiency is reduced, while downsizing the automatic transmission 1 in the axial direction (i.e., along the width of the vehicle).

The discharge section is provided more inward than the second centrifugal balance chamber 77 in the radial direction, which is located more inward than the second friction plates 17 in the radial direction. As a result, the hydraulic oil in the second centrifugal balance chamber 77 can be discharged to the position not overlapping the second friction plates 17 in the axial direction without influencing the arrangement of the second engagement hydraulic chamber 67, which is aligned with the second centrifugal balance chamber 77 in the axial direction, the second friction plates 17, the second piston 47, etc.

Furthermore, the hydraulic oil in the second centrifugal balance chamber 77 is discharged outside the first drum 25, which is the closest to the front cover 21 blocking the front end of the transmission case 31, via the oil discharge passage 39. This reduces rotational resistance not only between the second friction plates 17 but also between the members located more inward than the first drum 25 and causing differential rotation.

The step 23a of the sleeve 23 is welded to the flange 13a of the input shaft 13, thereby reducing leakage of the hydraulic oil toward the second friction plates 17, which flows from the second centrifugal balance chamber 77 to the second oil passage 9 via the space 19. This reliably reduces degradation in the fuel efficiency.

Other Embodiments

The present invention is not limited to the above-described embodiment, and can be modified within the scope and spirit of the invention.

In the above-described embodiment, the hydraulic oil is discharged from the oil discharge passage 39 which is located closer to the front than the first drum 25. The oil discharge passage 39 may be located closer to the rear than the first drum 25, if the hydraulic oil can be discharged to the position not overlapping the second friction plates 17 in the axial direction.

While in the above-described embodiment, the step 23a of the sleeve 23 is welded to the flange 13a of the input shaft 13, the configuration is not limited thereto. For example, spline joint may be employed, in which a spline formed at the inner circumferential surface of the sleeve 23 at the top is fitted to a spline formed at the corresponding outer circumferential surface of the input shaft 13. In this case, a seal member is preferably provided, or the gap between the spline joint is preferably reduced to reduce leakage of the hydraulic oil from the spline joint.

While in the above-described embodiment, an example has been described where the drive source is the torque converter, the configuration is not limited thereto. The drive source may be other starting devices.

In the above-described embodiment, the hydraulic oil is supplied to the second centrifugal balance chamber 77 from the first oil passage 29 communicating with the oil supply passage 49, and discharged from the second oil passage 9 communicating with the oil discharge passage 39. The configuration is not limited thereto. The oil discharge passage 39 may be used as an oil passage for supplying the hydraulic oil to supply the hydraulic oil from the second oil passage 9 to the second centrifugal balance chamber 77, and the oil supply passage 49 may be used as an oil passage for discharging the hydraulic oil to discharge the hydraulic oil from the first oil passage 29.

The embodiments described above are illustrative only and should not be construed as limiting. It is intended by the following claims to claim any and all modifications, substitutions, additions, and omissions that fall within the proper scope of the claims appropriately interpreted in accordance with the doctrine of equivalents and other applicable judicial doctrines.

INDUSTRIAL APPLICABILITY

As described above, the present invention is useful for automatic transmission etc., in which a centrifugal balance chamber overlaps friction plates in the axial direction.

DESCRIPTION OF REFERENCE CHARACTERS

1 Automatic Transmission
5 First Clutch (Frictional Engagement Element)
7 Second Clutch (Frictional Engagement Element)
9 Second Oil Passage (Oil Passage) (Discharge Section)
11 Torque Converter (Drive Source)
13 Input Shaft
17 Second Friction Plate (Friction Plate)
19 Space
21 Front Cover
23 Sleeve
23b Through-Hole
25 First Drum (Drum)
27 Second Drum (Drum)
37 Second Hub (Hub)
39 Discharge Oil Passage
41 Boss (Cylindrical Member)
47 Second Piston (Piston)
57 Second Seal Plate (Seal Plate)
67 Second Engagement Hydraulic Chamber (Engagement Hydraulic Chamber)
77 Second Centrifugal Balance Chamber (Centrifugal Balance Chamber)

The invention claimed is:

1. An automatic transmission comprising:
a frictional engagement element for transmitting power input from a drive source via an input shaft, the frictional engagement element including
friction plates for connecting a drum to a hub,
an engagement hydraulic chamber and a centrifugal balance chamber located more inward than the friction plates in a radial direction,
a piston segmenting the engagement hydraulic chamber from the centrifugal balance chamber in an axial direction, and engaging and disengaging the friction plates based on a pressure difference between hydraulic oil in the chambers, and
the centrifugal balance chamber overlapping the friction plates in the axial direction;
a discharge section for discharging the hydraulic oil in the centrifugal balance chamber to a position not overlapping the friction plates in the axial direction; and
a cylindrical member supporting the input shaft inserted thereinto, wherein
the discharge section is located more inward than the centrifugal balance chamber in the radial direction, and includes an oil passage formed in the cylindrical member and extending in the axial direction,
an end of the oil passage at a non-drive source side in the axial direction communicates with the centrifugal balance chamber, and
an end of the oil passage at a drive source side in the axial direction communicates with a discharge oil passage provided in a position not overlapping the friction plates in the axial direction to extend in the radial direction.

2. The automatic transmission of claim 1, wherein
the frictional engagement element includes a plurality of frictional engagement elements, and
the discharge oil passage is, in the axial direction, closer to the drive source side than a drum of the one of the frictional engagement elements, which is the closest to a front cover blocking an end of a transmission case at the drive source side in the axial direction.

3. The automatic transmission of claim 2, wherein
the input shaft is transversely mounted in a vehicle along a width of the vehicle.

4. The automatic transmission of claim 1, further comprising:
a seal plate faces the piston in the axial direction such that the centrifugal balance chamber is located between the seal plate and the piston; and
a sleeve externally fitted to the cylindrical member, connected to the input shaft, and supporting an inner circumference of the seal plate at an outer circumference thereof, wherein
a substantially annular space is formed at an end of the cylindrical member at the non-drive source side in the axial direction to be surrounded by the end of the cylindrical member, the input shaft, and the sleeve, and to communicate with the oil passage,
a through-hole is formed in the sleeve to connect the space to the centrifugal balance chamber, and to extend in the radial direction, and
the sleeve is welded to the input shaft to reduce leakage of the hydraulic oil toward the friction plates, which flows from the centrifugal balance chamber to the oil passage via the space.

5. The automatic transmission of claim 4, wherein
the input shaft is transversely mounted in a vehicle along a width of the vehicle.

6. The automatic transmission of claim 1, wherein the input shaft is transversely mounted in a vehicle along a width of the vehicle.

7. An automatic transmission comprising:
a frictional engagement element for transmitting power input from a torque converter via an input shaft, the frictional engagement element including
friction plates for connecting a drum to a hub,
an engagement hydraulic chamber and a centrifugal balance chamber located more inward than the friction plates in a radial direction,
a piston segmenting the engagement hydraulic chamber from the centrifugal balance chamber in an axial direction, and engaging and disengaging the friction plates based on a pressure difference between hydraulic oil in the chambers, and
the centrifugal balance chamber overlapping the friction plates in the axial direction;
a discharge section for discharging the hydraulic oil in the centrifugal balance chamber to a position not overlapping the friction plates in the axial direction and being closer to the torque converter than the friction plates in the axial direction; and
a cylindrical member supporting the input shaft inserted thereinto, and extending in the axial direction, wherein
the drum is in a bottomed cylindrical shape,
a bottom of the drum is located closer to the torque converter than the friction plates in the axial direction, and
the discharge section includes an oil passage formed in the cylindrical member and extending in the axial direction, and discharges the hydraulic oil in the centrifugal balance chamber from the centrifugal balance chamber to a space between the bottom of the drum and the torque converter in a transmission case via the oil passage.

8. The automatic transmission of claim 7, wherein
another drum different from the drum is provided between the drum and the torque converter, and constitutes another frictional engagement element different from the frictional engagement element,
said another drum is in a bottomed cylindrical shape,
a bottom of said another drum is located closer to the torque converter than friction plates of said another frictional engagement element in the axial direction, and
the discharge section discharges the hydraulic oil in the centrifugal balance chamber from the centrifugal balance chamber to a space between the bottom of said another drum and the torque converter in the transmission case via the oil passage.

9. The automatic transmission of claim 8, further comprising:
a seal plate facing the piston in the axial direction such that the centrifugal balance chamber is located between the seal plate and the piston; and
a sleeve externally fitted to the cylindrical member, connected to the input shaft, and supporting an inner circumference of the seal plate at an outer circumference thereof, wherein
a substantially annular space is formed at an end of the cylindrical member at a non-torque converter side in the axial direction to be surrounded by the end of the cylindrical member, the input shaft, and the sleeve, and to communicate with the oil passage,
a through-hole is formed in the sleeve to connect the substantially annular space to the centrifugal balance chamber, and to extend in the radial direction, and
the sleeve is welded to the input shaft to reduce leakage of the hydraulic oil toward the friction plates, which flows from the centrifugal balance chamber to the oil passage via the substantially annular space.

10. The automatic transmission of claim 7, wherein
a cover member and another drum are provided between the drum and the torque converter such that the cover member is closer to the torque converter than said another drum,
the cover member is adjacent to an end of the transmission case at the torque converter in the axial direction,
said another drum is different from the drum, and constitutes another frictional engagement element different from the frictional engagement element,
said another drum is in a bottomed cylindrical shape,
a bottom of said another drum is located closer to the torque converter than friction plates of said another frictional engagement element in the axial direction, and
the discharge section discharges the hydraulic oil in the centrifugal balance chamber from the centrifugal balance chamber to a space between the bottom of said another drum and the cover member in the transmission case via the oil passage.

11. The automatic transmission of claim 10, further comprising:
a seal plate facing the piston in the axial direction such that the centrifugal balance chamber is located between the seal plate and the piston; and
a sleeve externally fitted to the cylindrical member, connected to the input shaft, and supporting an inner circumference of the seal plate at an outer circumference thereof, wherein
a substantially annular space is formed at an end of the cylindrical member at a non-torque converter side in the axial direction to be surrounded by the end of the cylindrical member, the input shaft, and the sleeve, and to communicate with the oil passage,
a through-hole is formed in the sleeve to connect the substantially annular space to the centrifugal balance chamber, and to extend in the radial direction, and
the sleeve is welded to the input shaft to reduce leakage of the hydraulic oil toward the friction plates, which flows from the centrifugal balance chamber to the oil passage via the substantially annular space.

12. The automatic transmission of claim 7, further comprising:
a seal plate facing the piston in the axial direction such that the centrifugal balance chamber is located between the seal plate and the piston; and
a sleeve externally fitted to the cylindrical member, connected to the input shaft, and supporting an inner circumference of the seal plate at an outer circumference thereof, wherein
a substantially annular space is formed at an end of the cylindrical member at a non-torque converter side in the axial direction to be surrounded by the end of the cylindrical member, the input shaft, and the sleeve, and to communicate with the oil passage,
a through-hole is formed in the sleeve to connect the substantially annular space to the centrifugal balance chamber, and to extend in the radial direction, and
the sleeve is welded to the input shaft to reduce leakage of the hydraulic oil toward the friction plates, which flows from the centrifugal balance chamber to the oil passage via the substantially annular space.

13. The automatic transmission of claim 7, wherein
another drum different from the drum is provided between the drum and the torque converter, and constitutes another frictional engagement element different from the frictional engagement element, said another drum is in a bottomed cylindrical shape, a bottom of said another drum is located closer to the torque converter than friction plates of said another frictional engagement element in the axial direction, the cylindrical member is located at inner circumference of the frictional engagement element and said another frictional engagement element, and the discharge section discharges the hydraulic oil in the centrifugal balance chamber from the centrifugal balance chamber to a space between the bottom of said another drum and the torque converter in the transmission case via the oil passage.

14. An automatic transmission comprising:

a frictional engagement element for transmitting power input from a drive source via an input shaft, the frictional engagement element including friction plates for connecting a drum to a hub, an engagement hydraulic chamber and a centrifugal balance chamber located more inward than the friction plates in a radial direction, a piston segmenting the engagement hydraulic chamber from the centrifugal balance chamber in an axial direction, and engaging and disengaging the friction plates based on a pressure difference between hydraulic oil in the chambers, and the centrifugal balance chamber overlapping the friction plates in the axial direction; and a discharge section for discharging the hydraulic oil in the centrifugal balance chamber to a position not overlapping the friction plates in the axial direction, wherein the drum is in a bottomed cylindrical shape, a bottom of the drum is located closer to one side of a transmission case than the friction plates in the axial direction, and the discharge section discharges the hydraulic oil in the centrifugal balance chamber to a space closer to the one side of the transmission case than the bottom of the drum in the axial direction.

15. The automatic transmission of claim 14, further comprising:

a cylindrical member supporting the input shaft inserted thereinto, and extending in the axial direction, wherein the drum is placed such that the bottom of the drum is located closer to the drive source than the friction plates in the axial direction, another drum different from the drum is provided between the drum and the drive source, and constitutes another frictional engagement element different from the frictional engagement element, said another drum is in a bottomed cylindrical shape, a bottom of said another drum is located closer to the drive source than friction plates of said another frictional engagement element in the axial direction, and the discharge section includes an oil passage formed in the cylindrical member and extending in the axial direction, and discharges the hydraulic oil in the centrifugal balance chamber from the centrifugal balance chamber to a space between the bottom of said another drum and the drive source in the transmission case via the oil passage.

16. The automatic transmission of claim 14, further comprising:

a cylindrical member supporting the input shaft inserted thereinto, and extending in the axial direction, wherein the drum is placed such that the bottom of the drum is located closer to the drive source than the friction plates in the axial direction, a cover member and another drum are provided between the drum and the drive source such that the cover member is closer to the drive source than said another drum, the cover member is adjacent to an end of the transmission case at the drive source in the axial direction, said another drum is different from the drum, and constitutes another frictional engagement element different from the frictional engagement element, said another drum is in a bottomed cylindrical shape, a bottom of said another drum is located closer to the drive source than friction plates of said another frictional engagement element in the axial direction, and the discharge section includes an oil passage formed in the cylindrical member and extending in the axial direction, and discharges the hydraulic oil in the centrifugal balance chamber from the centrifugal balance chamber to a space between the bottom of said another drum and the cover member in the transmission case via the oil passage.

* * * * *